Oct. 28, 1958  S. N. STEVENS  2,857,800
ROLLER INSPECTING DEVICE
Filed Nov. 20, 1952  2 Sheets-Sheet 1
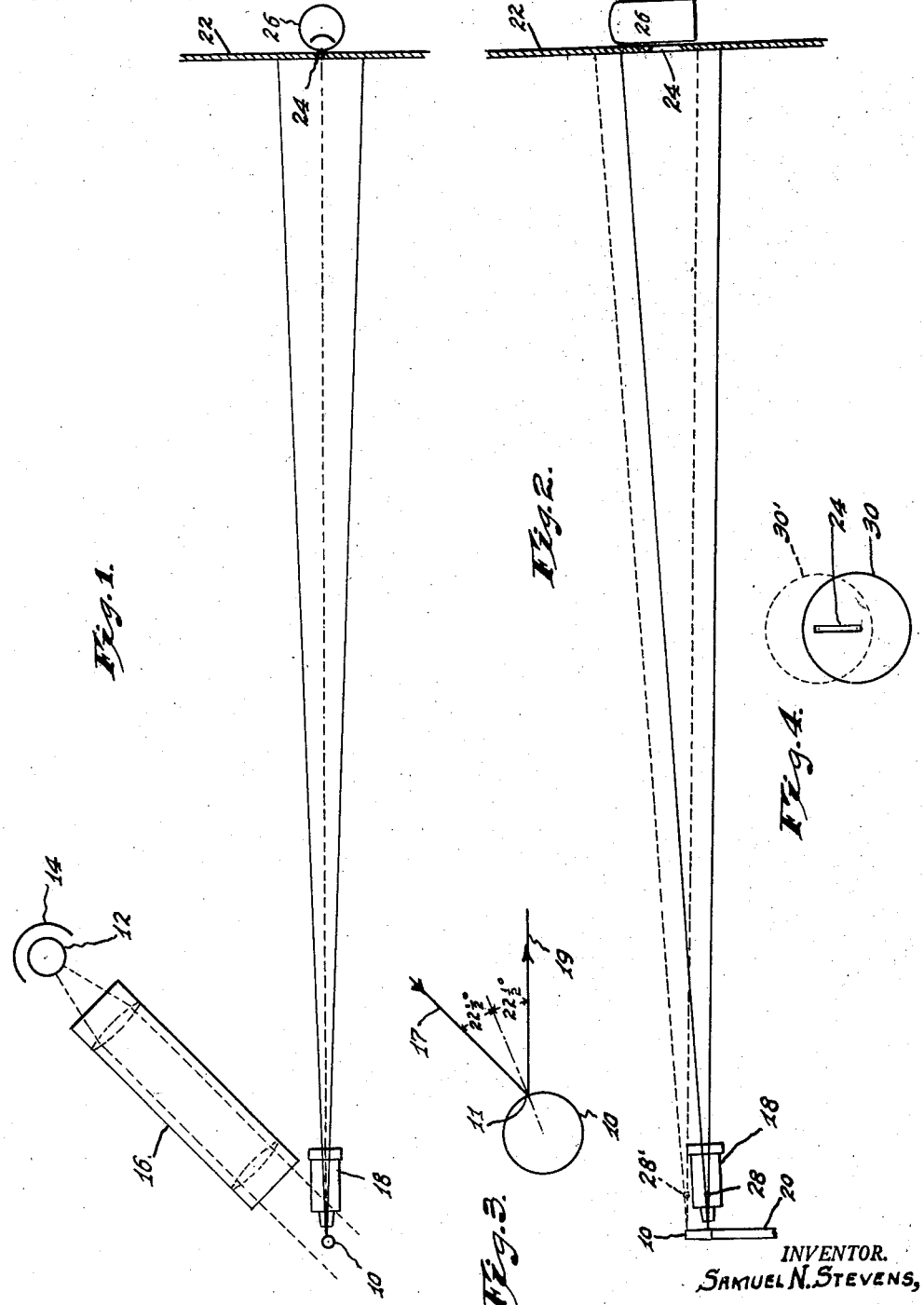
INVENTOR.
SAMUEL N. STEVENS,
BY
ATTORNEYS.

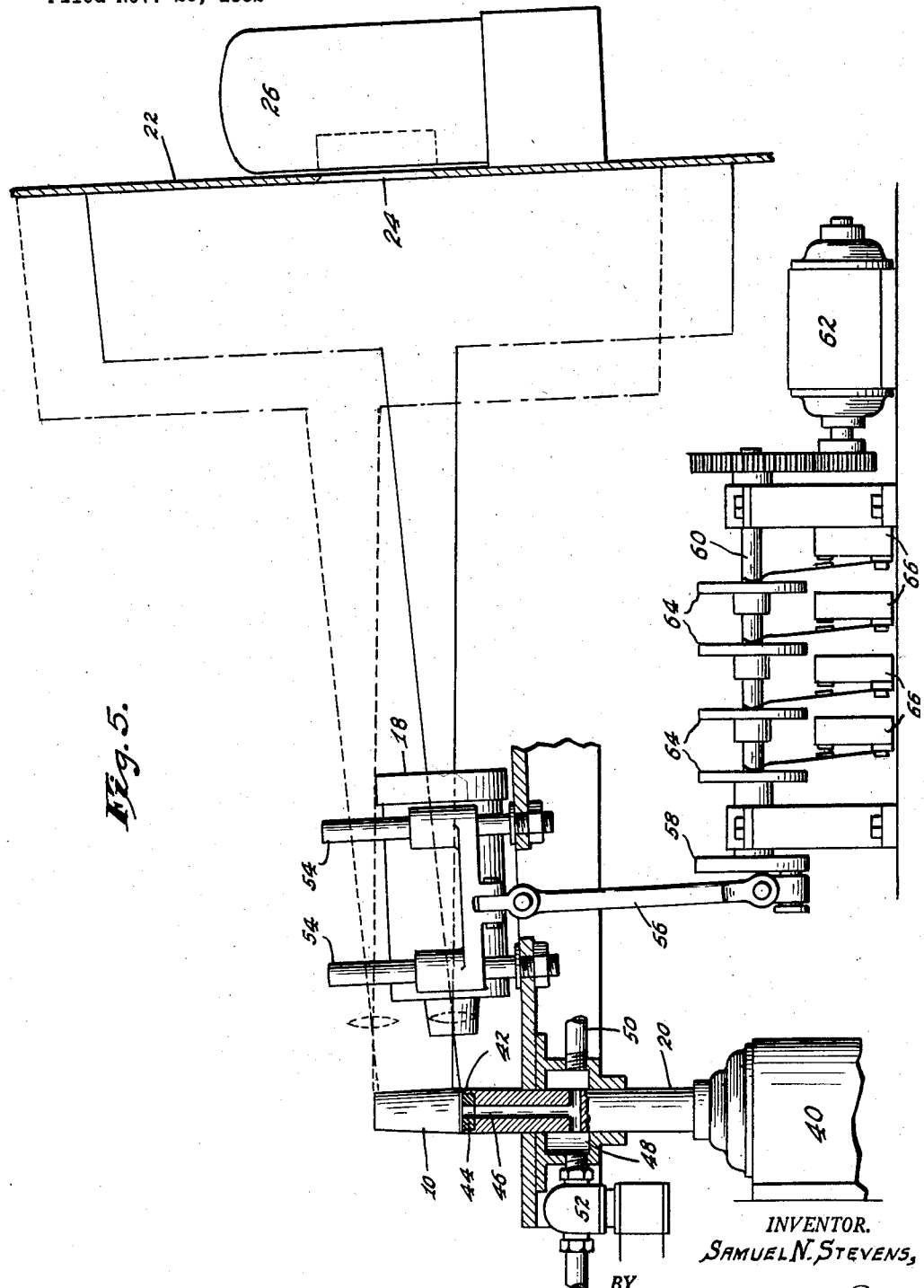

United States Patent Office 2,857,800
Patented Oct. 28, 1958

2,857,800

ROLLER INSPECTING DEVICE

Samuel N. Stevens, West Lafayette, Ind., assignor to The Timken Roller Bearing Company, Canton, Ohio, a corporation of Ohio Application November 20, 1952, Serial No. 321,610

7 Claims. (Cl. 88—14)

This invention relates to the inspection of bearing rollers and the like, and more particularly to apparatus for generating an electrical signal containing variations corresponding to variations in the surface characteristics of a roller-like object. The signal generated is adapted to be interpreted by the interpretation method and apparatus of my co-pending application Serial No. 250,338, filed October 8, 1951.

In that co-pending application, a scanning spot of light derived from a point source is directed by a lens system onto the surface to be inspected and moved in a scanning movement over that surface. That system requires a point source of light of constant and stable intensity. By my present invention, I avoid the necessity for a point source of light, and thus make it substantially easier to obtain constant and stable illumination of the inspected piece. A stable light source for general high-intensity illumination of the inspected piece may be obtained in accordance with my co-pending application Serial No. 296,697, filed July 1, 1952, now Patent No. 2,823,301, issued February 11, 1958.

It is therefore the object of this invention to generate an electrical inspection signal which varies with the reflectance characteristics of a surface illuminated with high-intensity, directed light. It is an object of the invention to delineate an inspection spot on such surface by control of the reflected light. It is an object of the invention to obtain the inspection response from light reflected from a curved surface in a shallow field and at a direct reflectance angle with respect to the direction of the light by which the surface is illuminated. It is an object of the invention to provide an optical system in which the optical characteristics and the physical parts permit the obtaining of such direct-reflectance spots. It is an object of the invention to move the inspection spot in a scanning path over the surface by physical movement of compact physical parts of low mass.

In accordance with the invention a roller-like object having a surface of generation to be inspected is rotated or spun on the axis of its surface of generation, and illuminated from a predetermined angle to that surface by a controlled beam of directed light from a high intensity light source. The illuminated spinning surface is observed from an acute angle of specular or direct reflectance with an optical system of high magnification and large aperture and with a focal length sufficiently long to dispose the optical mechanism at a point which avoids interference with the path of incident light and which permits the reflectance angle to be small to give a shallow field on the curved spinning surface. The optical system is focused on an observed field of the direct reflectance area and projects an enlarged image of the order of from fifty to one-hundred times the diameter of the observed field. A light-sensitive element is exposed to a delineated area of the projected image, and generates an electrical signal in response to the projected reflected light falling on such delineated area. The small area of the observed field corresponding to the delineated area of the projected image thus constitutes a delineated scanning spot. Such spot is desirably of generally rectangular shape, narrow in the direction of surface movement of the inspected surface and elongated in a direction along an element of the reflectance area of the generated surface. To scan the inspection surface of a roller-like object, the roller is spun on its axis, and the scanning spot is relatively moved along the element of the generated surface, for example, in a cylindrical roller, parallel to the axis of the roller. The combination of spinning the roller and traversing the spot along its surface causes the spot to thread that surface in a continuous observation which can be either a complete inspection or a partial inspection depending upon the portion of the surface over which the scanning spot is moved and depending upon the pitch of the threading movement of the spot over such surface.

The scanning movement is desirably obtained by moving the scanning spot with respect to the spinning roller while holding the spinning roller in a fixed position without traverse movement of the roller itself. This may be done by moving both the observing optical system and the light-sensitive element; but preferably, the lens assembly of the optical system is moved, and the optical characteristics and the movement are so inter-related that the light-sensitive element positioned at a remote point can be held stationary. To this end, the projected image has a diameter parallel to the direction of movement which is substantially greater than the length of the movement so that the projected images at the extreme positions of scanning movement overlap. The light-sensitive element, or the opening which delineates the effective area of the projected image, is positioned in the overlapping portions of the two extreme positions of the projected image. While with this arrangement the effective portion of the projected image varies its position in the projected image during the scanning movement, such variation of position produces no harmful variation in the inspection response, and the arrangement is found to be highly satisfactory and to greatly reduce the complexity of the apparatus and the mass of the moving parts.

The accompanying drawings illustrate my invention. In such drawings:

Fig. 1 is a diagrammatic plan view of an inspection system embodying my invention;

Fig. 2 is a diagrammatic front elevation of the system shown in Fig. 1;

Fig. 3 is an enlarged diagrammatic plan view showing the directions of the incident and reflected light with respect to the inspection surface of a roller;

Fig. 4 is a diagrammatic view showing the extreme positions of the projected image and the position of the delineated effective area with respect thereto; and Fig. 5 is a front elevation, partly in section showing mechanism providing the inspection system shown in Fig. 1.

The inspection system is shown in Figs. 1 and 2 as arranged for inspection of a tapered bearing roller 10. During inspection, the roller 10 is supported at the upper end of a spindle 20 rotating on a vertical axis. The roller 10 is illuminated from a high intensity light source 12, such as a 500 watt projection lamp, whose intensity is suitably controlled to a constant value. The light source is desirably provided with a reflector 14, and the light passes through a lens tube 16 and is projected therefrom in a directed beam of uniform intensity, and desirably of parallel rays, to illuminate the whole length of the spinning roller along an element 11 thereof, from the direction of line 17 in Fig. 3. A lens 18, comprising an assembly of individual lenses, is positioned to receive reflected light from the roller 10, and its axis 19 is positioned at an acute angle of direction reflectance from the direction 17 of the incident light. In the desired direct-reflectance relationship, the axis of observation 19 is disposed at the angle of reflection of the incident light from the light source. The angle between the incident and the directly reflected light is designated the "direct-reflectance angle," and is the sum of the equal angles of incidence and reflection. The direct-reflectance angle, between the lines 17 and 19, is desirably a small angle, of about 45° or less, so that the axis 19 of observation is close to normal to the observed surface, to put the observed surface in a shallow field of observation for sharp focus.

The lens 18 is of large aperture and is of a focal length permitting it to be disposed at a distance from the spinning roller 10 sufficient to avoid interference with the incident light. The reflected light is projected by the lens assembly to produce a projected image in the plane of a mask 22 remote from the lens assembly 18. I have found it convenient to use as the inspection lens an $f./1.9$ projection lens having a focal length of 15 mm., and to position the mask 22 at a distance of about 40 inches from the spinning roller 10. With such lens, the reflectance angle 17—19 was 45°, as shown in Fig. 3, which puts the axis 19 of observation at an angle of only 22½° from normal.

The mask 22 is provided with a slit 24, conveniently about a ⅛" wide by 1" long, and parallel with the element 11 of the roller 10. Behind the slit 24 there is positioned a light-sensitive element 26, conveniently a multiplier photo tube having a light-sensitive cathode of substantially the same area and shape as the slit 24. The circuits in which the photo tube is connected are such as to produce an electrical signal which varies with the intensity of light falling on the photo tube, and are preferably like those shown in my co-pending application Serial No. 250,338.

Since the roller 10 is tapered and its inspection surface at an angle to the vertical axis of rotation of the roller 10, the axis 19 of the inspection beam is correspondingly inclined so that it is perpendicular to the element 11 in observed position of the roller surface, and the mask 22 and light sensitive element 26 are positioned normal to that axis 19.

During the inspection operation, the lens 18 moves parallel to the element 11 of the inspected surface, a distance equal to the length of that element; to carry its optical center 28 between the positions marked 28 and 28' in Fig. 2. In the lowermost position of the optical center 28 the projected inspection beam follows the path indicated by the full lines of Fig. 2, while in the uppermost position 28' of the optical center, the inspection beam follows the path indicated in dotted lines in Fig. 2. When the inspection beam is in its lowermost position, its projected image 30 lies in a position with respect to the slit 24 as shown in full lines in Fig. 4, and the effective area of the image delineated by the slit 24 is thus an upper narrow central portion of that image. When the inspection beam is at its upper extreme position, as shown in dotted lines in Fig. 2, the image it projects takes the dotted line position of Fig. 4, and the effective area delineated by the slit 24 is a lower portion of that image.

The effective area of the projected beam is always delineated within the beam by the slit 24, but varies its position within the beam by relative movement along a diameter in the direction of translation movement of the beam. Only the lens assembly 18 is moved, and the spinning roller 10 and the light-sensitive element are both held stationary.

The delineated effective area utilizes the full area of the light-sensitive element 26. The correspondingly-delineated effective inspection area, or scanning spot, on the roller surface is quite small and extends only a very short distance in the direction of curvature of the surface; with a ⅛" wide slit 24 the scanning spot is of the order of .002" wide. With the axis 19 of the observing beam nearly normal to the surface, the field depth of the .002" wide spot is quite shallow and the spot can be effectively in focus over its whole area.

The mechanism shown in Fig. 5 embodies the inspection system described above. The spindle 20 is driven by a motor 40 and carries at its upper end a vacuum chuck to support the bearing roller 10. The chuck comprises an outer rim 42 on which the end face of the roller 10 is adapted to be seated in locating engagement, and within this rim 42 there is a resilient sealing member 44 adapted to make sealing engagement with the end face of the roller 10. The spindle has a central bore 46 connected with a cross hole opening to a vacuum chamber 48. This is connected to a vacuum line 50 and is desirably also connected to an air admission valve 52 operable by an attached solenoid to break the vacuum.

The lens 18 is mounted on a pair of slides 54 for sliding movement parallel to the element 11 of the conical surface of the roller 10, and is adapted to be moved from the position shown in Fig. 5 upward to the position of the dotted line showing of the inspection beam. The lense 18 is reciprocated between such positions by an articulated link 56 driven by a crank 58 on a shaft 60 driven by a motor 62. Conveniently, the shaft 60 carries a number of cams 64 arranged to actuate control and timing switches 66. The inspection beam of reflected light is projected by the inspection lens assembly 18 toward the photo tube 26 suitably supported in fixed position at a remote point. The mask 22 shields the photo tube 26 and passes to it that portion of the projected beam which is delineated by the slit 24.

An inspection operation is carried out as follows: A roller 10 to be inspected is placed on the chuck as the upper end of the spindle 20 and is held thereon by the vacuum applied through the vacuum line 50, so that the roller spins on the axis of its surface of generation. Constant high-intensity light is projected onto the roller as shown in Figs. 1 and 3 in a directed beam from a direction 17 to strike the roller at an element 11 of its surface from an angle as indicated in Fig. 3. Light is directly reflected from the surface of the roller at and adjacent the element 11 in a direction along the axis 19 of the lens 18, and is projected by the inspection lens 18 toward the slit 24 and the photo tube 26. The lens 18 is reciprocated on its slides 54 parallel to the element 11 of the roller surface over a path which carries it to the positions shown in Figs. 2 and 5. Its travel may extend beyond these positions, in which case the electrical circuits connected to the photo tube 26 may be connected and interrupted in timed relation by the switches 66 to render the inspection operation effective during only that portion of the travel of the lens 18 between the ends of the surface to be inspected. At the end of the inspection operation, the roller may be removed from the spindle 20 by timed actuation of the vacuum-breaking valve 52 and a suitable ejection mechanism.

During the inspection operation an image of an observed field on the roller surface adjacent the element 11 is projected toward the photo tube 26. The slit 24 delineates an effective portion of the projected image and hence delineates an effective portion of the observed image. This delineated portion of the observed image, or the scanning spot, is a narrow elongated area extending along the element 11 of the inspected surface. The movement of the lens assembly 18 carries this inspection spot longitudinally of the spinning roller 10 and the entire surface of that roller is thus scanned. Since the incident light is controlled to a constant intensity, variations in the effective portion of the inspection beam, that is, the portion thereof delineated by the slit 24, will result only from variations of the reflectance characteristics of the spinning surface. Imperfections on that surface will reduce the intensity of the reflected light and will accordingly reduce the amount of light reaching the light responsive photo tube 26. As a result, the electrical signal generated in the photo tube circuit will vary with variations in the reflectance characteristics of the inspected surface and any imperfections will show up as variations in that electrical signal. The variations in that signal will to a large extent have characteristics representative of the character of defect observed. For example, the magnitude of the signal variation will be representative of the magnitude of the defect; a crack will show up as a cyclic series of signal variations, etc. The electrical signal representative of the surface conditions of the roller 10 may be interpreted as shown in my co-pending application Serial No. 250,338, as by clipping the electrical signal at a plurality of different voltage levels, counting the variations exceeding each such clipping level, and comparing the counts at each such level with predetermined standards.

In view of the movement of the inspection beam and its projected field with respect to the fixed slit 24 and the fixed photo tube 26, the effective portion of the beam will vary its position in the beam during such movement, but that relative change in position has no harmful effect, and so long as the slit 24 is on the proper diameter of the image and within the image, an effective inspection operation is obtained without the necessity of moving the spinning roller 10 or the slit 24 or photo tube 26.

I claim as my invention:

1. Inspection apparatus for generated surfaces, comprising means to rotate the surface on its axis, means to project light onto a predetermined lineal area of the moving surface in a direction to reflect at an acute angle to the incident light, an inspection lens in the reflected-light path to project to a remote plane and enlarged image of an observation field of said area, means to move said lens along said lineal area a distance such that a portion of the remote plane is continuously within the projected image, means in said portion to delineate an effective image portion and thus to delineate a portion of the observed field as a scanning spot, said surface rotation and lens movement causing said spot to thread said surface in a scanning movement, and a light sensitive element responsive to said effective image portion to generate an electrical signal corresponding to the reflectance characteristics of the scanned surface.

2. Inspection apparatus for generated surfaces, comprising means to rotate the surface on its axis, means to project light onto a predetermined lineal area of the moving surface in a direction to reflect at an acute angle to the incident light, an inspection lens in the reflected light-path to project to a remote plane an enlarged image of an observation field of said area, means to move said lens along said lineal area while maintaining a predetermined portion of said remote plane continuously within the projected image, and light-sensitive means responsive to light at said predetermined plane portion to generate an electrical signal.

3. Inspection apparatus for generated surfaces, comprising means to rotate the surface on its axis, means to project light onto a predetermined lineal area of the moving surface in a direction to reflect at an acute angle to the incident light, an inspection system including an observation lens at the angle of reflection of such light to receive light reflected at said angle from an observed field of said lineal area and including a light sensitive element responsive to light reflected from said field, and means to move the lens with respect both to the surface and to the light sensitive element and thereby to traverse the observed field along said lineal area.

4. Inspection apparatus for bearing rollers, comprising means to support a roller in position to expose a generated surface thereof, a light system to project light onto a predetermined lineal area thereof from a direction to reflect at an acute angle to the incident light, an optical system at the angle of reflection to receive the reflected light, a light sensitive element responsive to light projected by said optical system from a scanning spot of said area, and means to cause relative scanning movement of said spot and said generated surface, including relative movement between said optical system and light-sensitive element.

5. Inspection apparatus for bearing rollers, comprising means to support a roller in position to expose a generated surface thereof, a light system to project light onto a predetermined lineal area thereof from a direction to reflect at an acute angle to the incident light, an optical system at the angle of reflection to receive the reflected light, a light sensitive element responsive to light projected by said optical system from a scanning spot of said area, and means to cause relative scanning movement of said spot and said generated surface, including both relative movement between said generated surface and said optical system and relative movement between said optical system and said light sensitive element.

6. Inspection apparatus for tapered bearing rollers, comprising means to rotate a roller on its axis, a light system to project light onto a predetermined lineal area thereof from a direction to reflect at an acute angle to the incident light, a lens having its axis at the angle of reflection of such light to receive the light reflected from an observed field of said lineal area, a light sensitive element responsive to a limited portion of the field of reflected light transmitted by said lens, and means to move the lens parallel to a roller surface element passing through said observed field, said light sensitive element being relatively fixed in a position to be continuously within the field of light transmitted by the lens during a considerable movement of the lens.

7. Inspection apparatus for tapered roller bearings, comprising means to support and rotate a roller in fixed position on the axis thereof, a light system to project light onto the roller to illuminate with substantially uniform intensity a lineal area which extends a substantial distance along an element of its rotating tapered surface, said light being directed to produce specular reflection substantially in a plane containing the said surface element and at an acute angle to the incident light, an inspection lens having its axis positioned in said plane to receive specularly reflected light from an inspection spot on said lineal area and to project a magnified image thereof, means to move said lens in said plane in a direction parallel to said surface element to cause relative scanning movement of said inspection spot along said lineal area, while maintaining the inspection lens both in constant focus relationship with the surface of said lineal area and constantly in position to receive specularly reflected light from the moving inspection spot, and light sensitive means responsive to light projected by said lens.

References Cited in the file of this patent

UNITED STATES PATENTS

| | | |
|---|---|---|
| 1,640,567 | Firestone | Aug. 30, 1927 |
| 2,027,595 | Knobel et al. | Jan. 14, 1936 |
| 2,208,882 | Graff et al. | July 23, 1940 |
| 2,246,501 | Bradner et al. | June 24, 1941 |
| 2,265,037 | Gulliksen | Dec. 2, 1941 |
| 2,313,218 | Brace et al. | Mar. 9, 1943 |
| 2,451,501 | Liben | Oct. 19, 1948 |
| 2,531,529 | Price | Nov. 28, 1950 |
| 2,593,127 | Fedorchak | Apr. 15, 1952 |

FOREIGN PATENTS

| | | |
|---|---|---|
| 120,183 | Sweden | Nov. 11, 1947 |